J. BE GOLE.
HYDROCARBON MOTOR.
APPLICATION FILED NOV. 15, 1918.

1,437,708.

Patented Dec. 5, 1922.

Inventor,
James BeGole,
By
Atty.

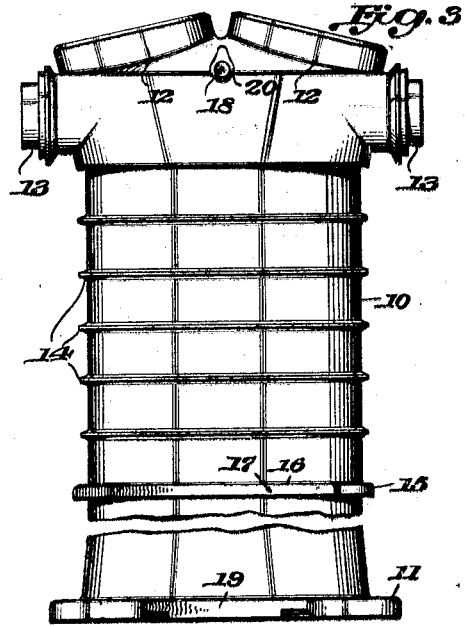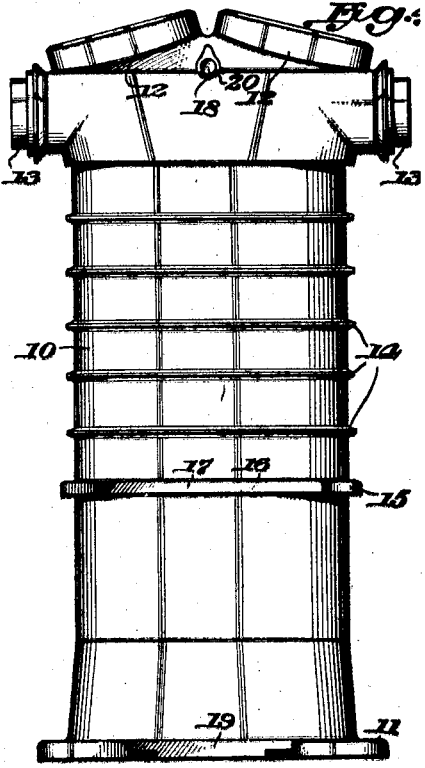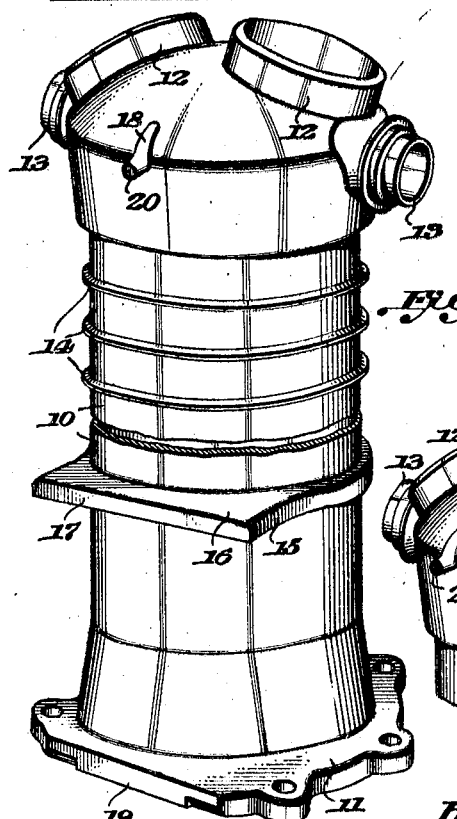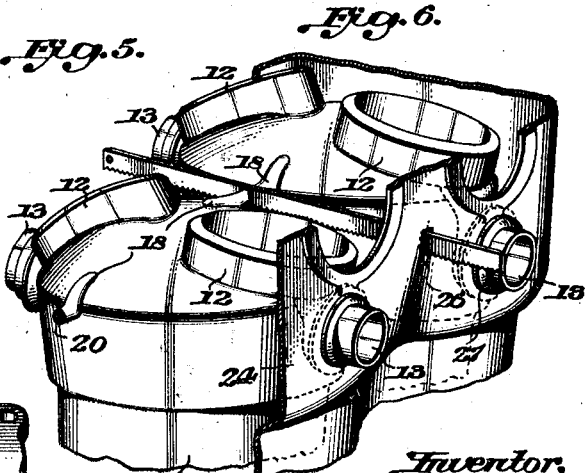

Patented Dec. 5, 1922.

1,437,708

UNITED STATES PATENT OFFICE.

JAMES BE GOLE, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Original application filed July 19, 1917, Serial No. 181,585. Divided and this application filed November 15, 1918. Serial No. 262,668.

*To all whom it may concern:*

Be it known that I, JAMES BE GOLE, a citizen of the United States, and resident of Detroit, Wayne County, State of Michigan, have invented certain new and useful Improvements in Hydrocarbon Motors, of which the following is a specification.

This application is a division of application Serial No. 181,585 filed July 19, 1917, Patent No. 1,292,683.

The present invention relates to hydrocarbon motors and particularly motor cylinder blocks.

One of the objects of the invention is to provide a cylinder block made up of several cylinders having separated and aligned abutting flanges welded together.

Other objects of the invention will appear from the following description taken in connection with the drawings which form a part of this specification, and in which:—

Fig. 3 is an elevation of one of the cylinders for the block shown in Figs. 1 and 2, with the flange faces shown in rough;

Fig. 4 is similar to Fig. 3 except that the flange faces and positioning lug have been machined or planed off;

Fig. 5 is a perspective view of the cylinder shown in Fig. 4, and

Fig. 6 is a perspective view of the upper parts of two adjacent cylinders with parts of the water jackets cut away to illustrate the method of removing some of the metal from the ends of the positioning lugs, in accordance with this invention.

Figure 1:
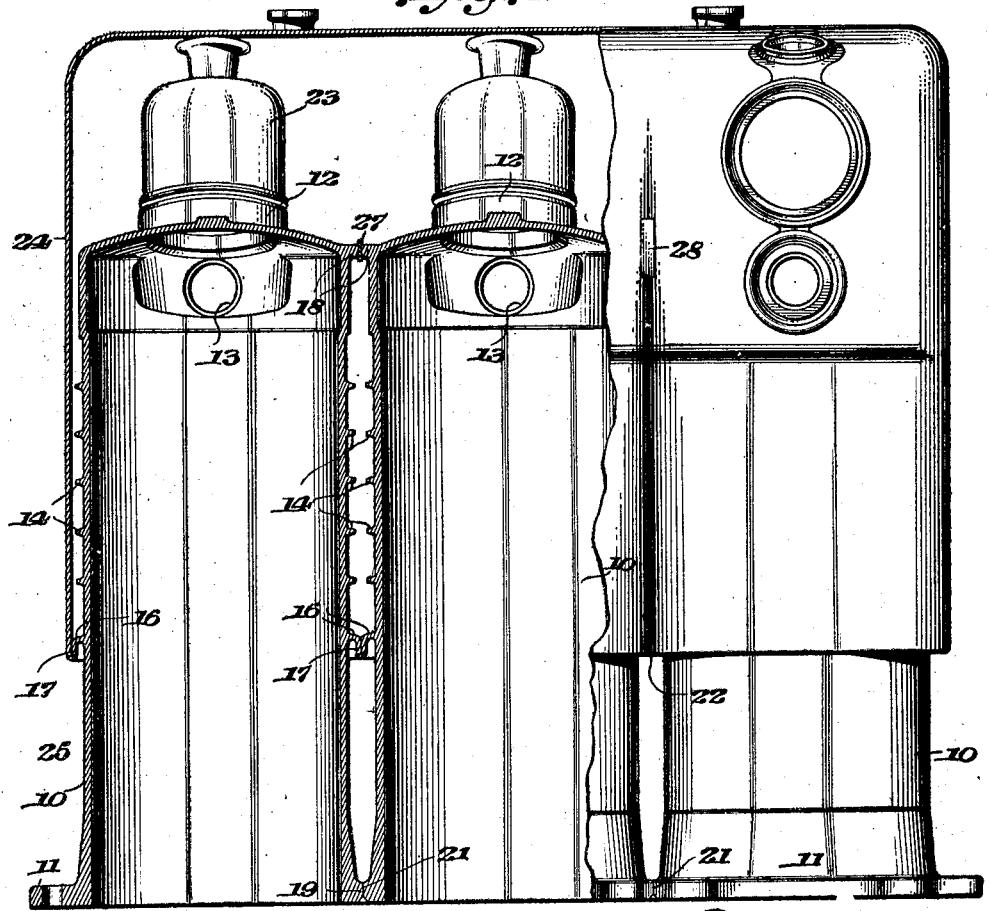
Fig. 1 is a side elevation of a cylinder block made in accordance with this invention, parts being broken away to illustrate the interior construction.

In making up cylinder blocks for hydrocarbon motors it is particularly essential that the cylinders shall be properly aligned relative to each other. It is also desirable that the upper ends or heads of the cylinders should be somewhat free to expand relatively to the other cylinders, after the cylinder block is complete and assembled as a part of a motor. When such cylinder blocks are made up by welding parts of them together, the intense welding heat makes it very difficult to retain the cylinders in their correct relative positions. The present invention provides a cylinder block in which there are two spaced and aligned welded joints between adjacent cylinders while the upper parts or heads of the cylinders are left free to independently expand or retract.

Referring to the drawings, one of the rough machined cylinders is shown at 10 in Fig. 3. At the base of the cylinder there is an attaching flange 11 and at the head end of the cylinder there are bosses 12 and 13 to which other parts of the cylinder block may be connected. The cylinder body has strengthening ribs 14 formed thereon, and intermediate the ends of the cylinder there is a flange 15, the greater part of which conforms to the wall of the cylinder, but a small part 16 of which extends radially somewhat farther than the remainder and has a comparatively flat face 17 formed on it. Also at the head end of the cylinder there is a positioning lug 18, the outer surface area of which is small relating to the faces 17 and 19 of the flanges. For the purpose of positioning this cylinder relatively to the next adjacent cylinder which is made in the same form, the attaching flange 11, the intermediate flange 16, and the positioning lug 18, are all machined or planed off so that their faces lie in a single plane exactly parallel to the center line of the cylinder bore. These three surfaces are indicated at 19, 17 and 20 respectively in Figs. 4 and 5. Thus it will be seen that two such cylinders may be placed together with their respective surfaces 19, 17, and 20 in contact and the parallelism of the axes of the two cylinders will be assured. Three such cylinders are shown placed together in Figs. 1 and 2, it being understood of course that the middle cylinder has these three surfaces 19, 17, and 20 formed on each of its sides. The said three cylinders shown in Figs. 1 and 2 are, after being so placed together, secured together by welding the abutting portions of their respective flanges 11 and 15 as shown at 21 and 22 in said figures.

Figure 2:
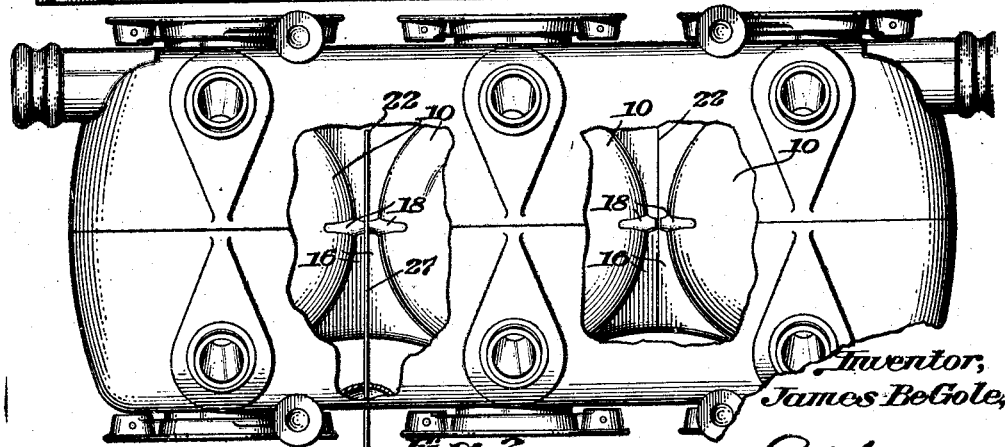
Fig. 2 is a plan view of the block shown in Fig. 1 also with parts broken away.

The cylinders are shown in Fig. 1 as having elbows 23 mounted on their heads, and a water jacket 24, which may if desired be formed in two parts welded together in the median plane of the motor, is placed around the cylinders and secured as by welding to the elbows 23, as shown in Figs. 1 and 2, and to the flanges 15 of the cylinders as shown particularly at 25 in Fig. 1.

During all of these welding operations, in which of course considerable heat is applied to various parts of the cylinders, the heads are maintained in correct relative position by means of the positioning lugs 18 above referred to. After the cylinders have been connected together and the cylinder block made up as above described, it is desirable, as suggested herein, to leave the heads of the cylinders free to expand and contract relatively to each other. In the present invention this is accomplished by removing some of the metal from the ends of the lugs 18 so that they will thereafter remain out of contact. Referring to Fig. 6 it will be seen that a slit 26 is cut in the water jacket 24 approximately opposite the lugs 18 between two of the cylinders and a saw 27, or other suitable tool, is inserted through this slit and a cut is made between the ends of the abutting lugs 18. The saw 27 is also shown in section in Fig. 1, and in plan in Fig. 2, and it will be understood that after the saw has passed between the lugs and is withdrawn, there is a space at least the thickness of the saw between the lugs so that they are out of contact.

After this sawing operation the slit 26 may be closed by welding the edges together or by welding on a patch 28 as shown at the right in Fig. 1.

But a single form of the invention is shown and described herein. However it will be understood that other forms and modifications may be made without departing from the spirit or scope of the invention.

Having thus described my invention, what I claim and desire to secure by Letters Patent is:

1. A cylinder block comprising a plurality of cylinders each having an end downwardly turned flange and a downwardly turned flange intermediate its ends, which flanges are in planes perpendicular to the axis of the cylinder and are joined to the flanges of the adjacent cylinder, the head ends of said cylinders being out of contact with each other.

2. A hydrocarbon motor cylinder having parts projecting beyond the cylindrical surface thereof and spaced from one another longitudinally of the axis of the cylinder, and with their outer or contact surfaces in the same plane, the uppermost of said projecting parts having its outer surface of small area relatively to the contact surfaces of the other parts, said parts being adapted for locating said cylinder in parallelism with an adjacent cylinder and some of said parts being adapted for enabling said cylinders to be joined.

3. A hydrocarbon motor cylinder adapted to constitute a unit of a multiple cylinder block, and having a spacing and positioning lug projecting laterally from its surface near its upper end for co-operation with an adjacent cylinder to which the first cylinder is adapted to be joined.

4. A hydrocarbon motor cylinder adapted to constitute a unit of a multiple cylinder block, having a plurality of flanges adapted to be welded to corresponding flanges on the adjacent cylinder unit and having means adjacent its upper end adapted to cooperate with the adjacent cylinder unit to position the units for welding.

5. A hydrocarbon motor cylinder adapted to constitute a unit of a multiple cylinder block, said cylinder having a plurality of spaced parallel flanges extending laterally from the cylinder and having a positioning lug spaced from the flanges, a part of the outer faces of said flanges and the outer end of said lug being in a single plane parallel with the axis of the cylinder.

6. A hydrocarbon motor cylinder adapted to constitute a unit of a multiple cylinder block, said cylinder having a laterally extending flange adjacent its lower end, a laterally extending flange intermediate its ends, and a positioning lug adjacent its upper end, a part of the outer faces of said flanges and the outer end of said lug being in a single plane parallel with the axis of the cylinder.

In testimony whereof I affix my signature.

JAMES BE GOLE.